Patented Mar. 18, 1930

1,751,234

UNITED STATES PATENT OFFICE

CECIL STEVENSON GARNETT, OF DERBY, ENGLAND

COMPOSITION AND MANUFACTURE OF REFRACTORY BASIC BRICK AND THE LIKE

No Drawing. Application filed March 6, 1923, Serial No. 623,286, and in Great Britain March 18, 1922.

This invention relates to the manufacture of basic refractory bricks and the like mainly from dolomite.

Hitherto it has been the general custom in the manufacture of bricks from dolomite to burn the rock so that the carbonates were completely dissociated and the carbon dioxide expelled; either all or the main part of the burnt dolomite was further "dead-burnt" and shrunk. It was then formed into bricks by the addition of "bonds" of various kinds of which the commonest was tar.

According to the present invention the total expulsion of the carbon dioxide is deliberately avoided and the dolomite is burned so that a considerable amount of carbon dioxide remains in the residue of burnt rock. This proportion of carbon dioxide may vary within somewhat wide limits, but I have found that burnt material containing 8 per cent to 12 per cent by weight of carbon dioxide is generally suitable, the proportion of carbon dioxide which will give the best results will vary according to the newness or staleness of the burnt dolomite at the time of using, less carbon dioxide being advisable if the material is somewhat stale.

I find that if the material contains too much carbon dioxide or is too stale, there is insufficient slacking on the addition of water and insufficient setting of the paste. If, on the other hand, the carbon dioxide content is too low and the material fresh from the kiln, on the addition of water the slaking will be too quick and vigorous and the paste will not conveniently set.

Calcination is preferably effected in such a kiln or manner as will prevent contamination of the material by fuel ashes, and so as to produce a light, non-shrunk, amorphous residue containing as near as may be the desired amount of carbon dioxide, and I prefer to use for this purpose a gas-fired kiln.

According to experiments made by me, under conditions comparable with industrial practice, dissociation was not appreciable under about 625° C.; from about 700° C. to 830° C. dissociation was very vigorous and it became complete at about 900° C. However, the working conditions of calcination such as the duration of the operation, may have an important effect on the expulsion of the carbon dioxide.

If it is found that the carbon dioxide contents vary somewhat from what is desired, the necessary quantity of more completely dissociated, non-shrunk dolomite may be added to reduce the average, or of more lightly burned dolomite to increase it.

The calcined dolomite after being ground is then mixed with such of the hereinafter mentioned or indicated substances as may be decided, which have been previously finely ground, the mixture made into a paste with water, which causes slaking, and moulded into bricks. The raw bricks may be dried and fired in the usual manner or they may, after drying, be fired when convenient.

Bricks formed from dolomite without the addition of such substances would, after cooling, be liable to hydration. I therefore so add substances for the purpose of preventing or retarding the hydration or perishing of the finished brick which would otherwise occur either before or after use. There are a large number of substances which have this effect in varying degrees, chiefly silicates and oxides, used either separately or as mixtures in varying proportions. The material first so used with success seems to consist mainly of alteration products of dolerite together with varying amounts of unaltered residual minerals and rocks; these include felspar, olivine, pyroxene (augite), chlorites, and indefinite transitional substances. I have found that rocks and mixtures consisting of the minerals augite and other pyroxenes, olivine, felspar (preferably such as labradorite) talc, serpentine, kaolin and similar minerals, chlorites, bauxite, and the like, can be generally used to produce satisfactory results.

The following are examples of actual mixtures which I have found successful as additions to the calcined dolomite, and indicate the manner in which rocks of an appropriate composition may be compounded and used.

I. Ten per cent of a mixture of equal proportions of talc, augite and olivine.

II. Ten per cent of a mixture of equal proportions of labradorite and serpentine.

III. 13.3 per cent of a mixture consisting of labradorite and kaolin in the proportions of 10 per cent and 3.3 per cent respectively.

IV. Ten per cent of a mixture of equal proportion of orthoclase, bauxite and serpentine.

V. Ten per cent of a mixture of equal proportions of orthoclase and talc.

VI. Ten per cent of a mixture of two thirds diallage and one third kaolin.

If rocks so used contain carbonates, it may be necessary to expel the carbon dioxide by calcining before adding to the calcined dolomite. If water is added to small quantities at a time of the mixture of calcined dolomite and other substances and the same worked quickly, using calcined dolomite having a suitable carbon dioxide content, forming a paste which is just fluid enough to run into the corners of the mould, into which it is placed before the slake occurs, the brick should then set quickly without any expansion or contraction. The larger the quantities made into a paste at a time the more difficult it will be to get the paste into the mould before the slake occurs.

If the burnt dolomite so used is quite fresh from the kiln the slaking may be found to occur too rapidly, in which case a little stale material should be added. On the other hand the material must not be allowed to become too stale or the slake may be insufficient. The terms "fresh" and "stale" are relative. Immediately after calcination the product is fresh. When stored in bulk it remains "reasonably fresh" and suitable for use in accordance with my examples for several days. After a further absorption of carbon dioxide and moisture it then becomes stale.

If it is decided that it is economically advantageous to mix in large quantities and mould after the slake (in which case the burnt dolomite need only be roughly ground) more water will be necessary to form the paste and the bricks will not be immediately set. It will be necessary that such bricks should be allowed to dry or be dried, to some extent, within the mold, and they may then show some contraction before firing.

Whichever method is adopted, the total contraction sustained by the bricks in manufacture is allowed for in the size of the working mould.

The substances which operate in retarding or preventing hydration or "perishing" of the brick do not all behave exactly alike; they differ in the effect they have on the size of the finished bricks, by increasing or decreasing the contraction on firing, normal to the burnt dolomite unmixed with these substances. On account of the greater tendency to loss of shape with increase of contraction, it is desirable to keep the contraction low, but when it is reduced much below the normal the density of the product is decreased and this is accompanied by a tendency to more feeble resistance to hydration.

Another difference in the effects of the added substances is their varying influence on the fusing point of the product.

When used in the same proportions the added substances do not all identically influence the fusibility of the brick or other article.

I have found that the addition of 7 per cent of alumina to the calcined dolomite operates in preventing hydration, but it induces somewhat excessive shrinkage in the finished bricks. Kaolin to the extent of approximately 5 per cent acts likewise; olivine or orthoclase when used alone tends to over retard shrinkage in firing, as does also talc, but, as hereinbefore stated, talc and orthoclase together have been used with success.

The presence of too much sulphur as sulphides in the fuel and materials used should be avoided.

A brick has been manufactured by me in which I used dolomite of the following analysis, namely:—Silica 0.16 per cent, alumina 0.09 per cent, ferrous oxide 0.41 per cent, lime 30.4 per cent, magnesia 21.3 per cent, carbon dioxide 47.6 per cent. This dolomite was calcined leaving in the residue 8 per cent of carbon dioxide and then ground, and 10 per cent finely ground labradorite and 3.3 per cent kaolin were added thereto. This mixture was made into a paste with water, placed in the mould before the slake occurred, dried and then fired to a temperature of 1500° C. The brick was found to be highly refractory in its capacity to withstand high temperatures, to have a low coefficient of expansion, to be capable of resisting considerable pressure in use and of great durability. Furthermore after prolonged exposure to the air and moisture it did not hydrate or "perish".

The term dolomite as herein used is not intended to be confined to the definite mineral species, the equimolecular double carbonate of calcium and magnesium, in the narrow sense, but includes the rock consisting essentially of that mineral or those compounds, and known by the same name, and also generally magnesian limestone containing considerable amounts of magnesia.

It is preferable that the magnesia contents of the rock used should be as high as possible, and for special purposes it may be advantageous to even add magnesia or otherwise increase such content. The dolomite should be analyzed and the impurities present allowed for if necessary when adding the other substances.

Having now described my invention what I claim as new and desire to secure by Letters Patent is:—

1. The process of manufacturing bricks from dolomite, which consists in calcining the dolomite until it contains 8 to 12 per cent by weight of carbon dioxide, grinding said calcined dolomite, adding thereto a substance calculated to prevent hydration of the finished article, adding water to the mixture, molding said mixture into the required shape, drying the same, and firing.

2. A basic refractory moulded and fired dolomitic article containing an addition of natural rock calculated to prevent hydration, which article has a fusing point approximate to that of pure calcined dolomite and is capable of resisting hydration and crumbling on prolonged exposure to air and moisture.

3. A composition for manufacturing a basic refractory consisting of a mixture of ground ignited dolomite containing an amount of carbon dioxide of the order of magnitude of 8 to 12% in admixture with ingredients calculated to prevent hydration of the finished article and slaked by addition of water, all the ingredients being so proportioned so that a finished article can be made of as high melting point as dolomite and yet will be resistant to hydration for a prolonged time.

4. As a step in the production of basic refractory articles, the process which consists in mixing a natural rock calculated to prevent hydration of the finished article, but not substantially to lower its melting point with ignited dolomite containing a substantial quantity of carbon dioxide and then slaking and moulding the mixture.

5. As a step in the production of dolomite bricks, or the like, the process which consists in igniting dolomite at a temperature high enough to produce a product which can be slaked and will set readily, but not higher than 830° C. so that the ignited product contains a substantial quantity of carbon dioxide, grinding said ignited dolomite, adding a substance calculated to prevent hydration of the finished article, but not substantially to lower its melting point, and then slaking the mixture.

In testimony whereof I have signed my name to this specification.

CECIL STEVENSON GARNETT.